L. I. YEOMANS.
SAWING MACHINE.
APPLICATION FILED AUG. 20, 1917.

1,305,858.

Patented June 3, 1919.
2 SHEETS—SHEET 1.

Witnesses:
Robert F. Weir
Arthur W. Carlson

Inventor
L. I. Yeomans
By Miller Chindahl Parker
Attys.

L. I. YEOMANS.
SAWING MACHINE.
APPLICATION FILED AUG. 20, 1917.
1,305,858.
Patented June 3, 1919.
2 SHEETS—SHEET 2.
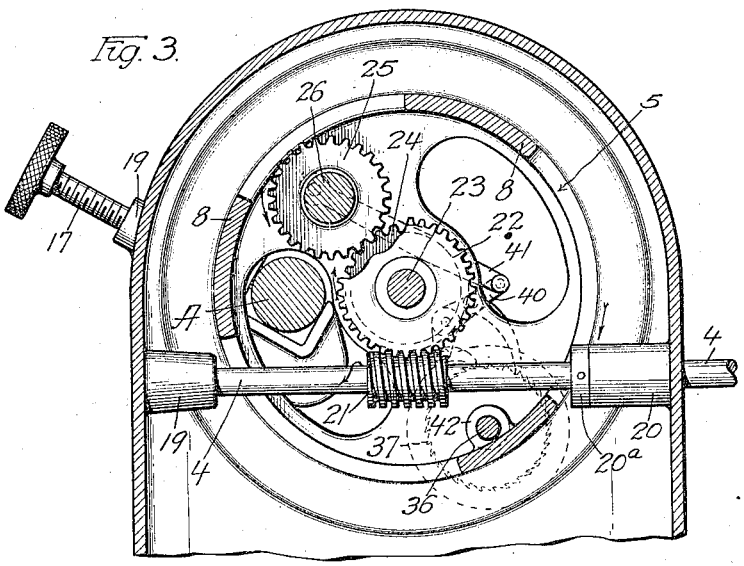
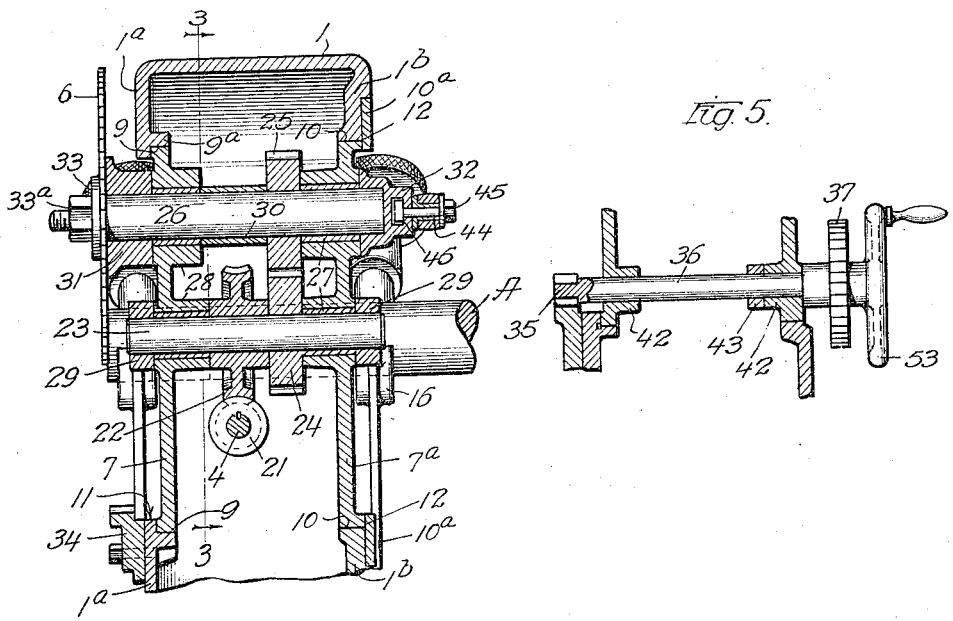
Witnesses:
Robert F. Weir
Arthur W. Carlson
Inventor
L. I. Yeomans
By Miller Chindahl Parker
Attys.

UNITED STATES PATENT OFFICE.

LUCIEN I. YEOMANS, OF CHICAGO, ILLINOIS, ASSIGNOR TO MANN CORPORATION, OF KANKAKEE, ILLINOIS, A CORPORATION OF ILLINOIS.

SAWING-MACHINE.

1,305,858.    Specification of Letters Patent.    Patented June 3, 1919.

Application filed August 20, 1917. Serial No. 187,104.

*To all whom it may concern:*

Be it known that I, LUCIEN I. YEOMANS, a citizen of the United States, residing at Chicago, in the county of Cook and State of Illinois, have invented certain new and useful Improvements in Sawing-Machines, of which the following is a specification.

The invention relates to improvements in cold-sawing machines, and the general object of the invention is to provide an inexpensive yet efficient and practical machine for sawing iron or steel such as rods, bars, beams and the like. Heretofore the market for sawing machines of this general type has been considerably restricted on account of their relatively high cost.

The object of the invention thus generally stated, together with other and ancillary advantages, may be attained by providing a supporting housing or frame having adjustable clamps for supporting the work to be operated upon and a drive shaft extending through the frame; and an oscillatory carrier mounted in the frame and having an eccentrically mounted shaft with a circular saw thereon which is automatically fed into engagement with the work as the drive shaft is rotated.

Figure 1:
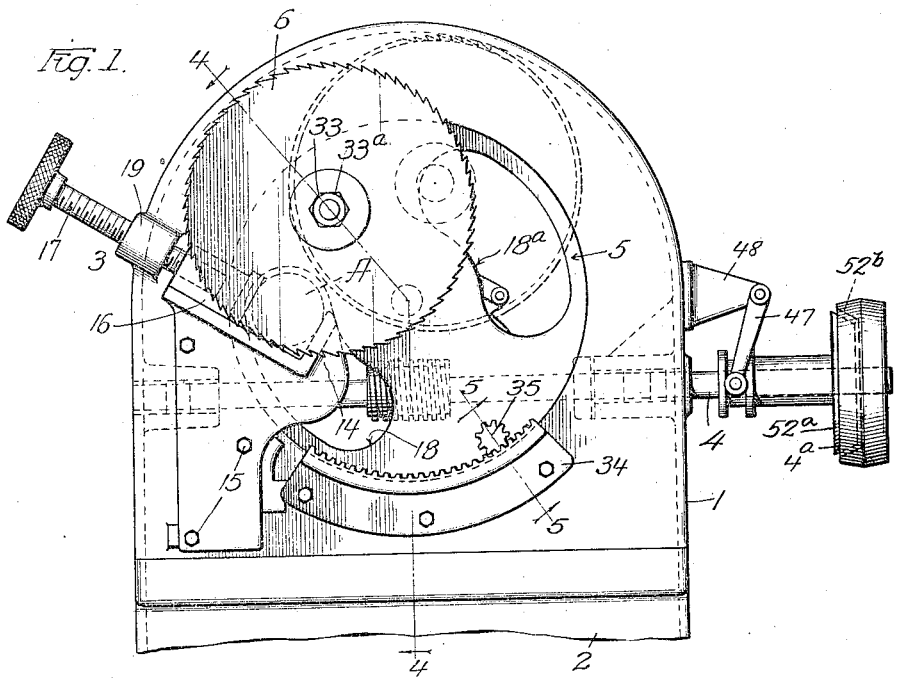
Figure 2:
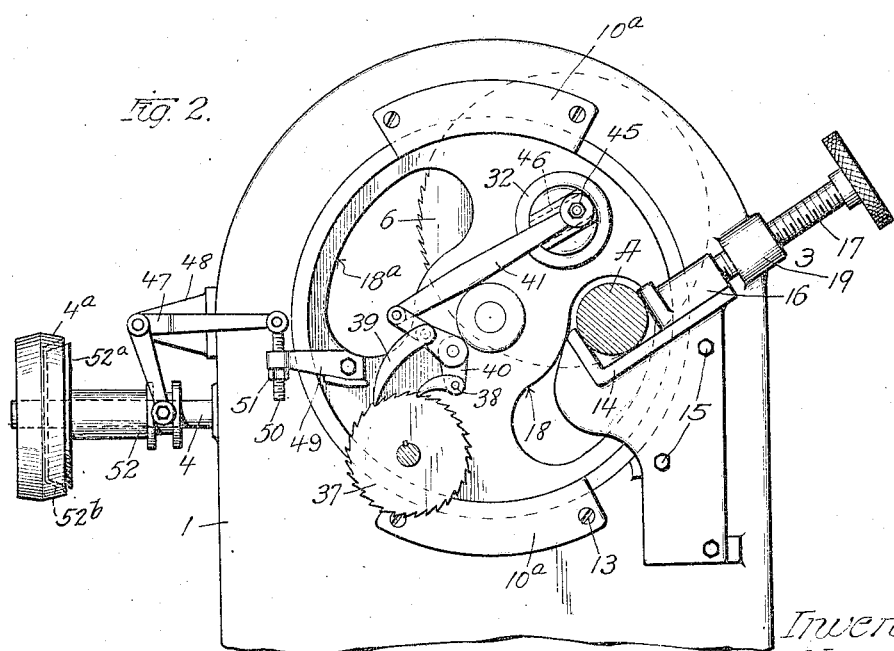

A preferred embodiment of the invention is illustrated in the accompanying drawings forming part hereof in which Figure 1 is a front side elevation of the improved sawing machine. Fig. 2 is a rear side elevation of the machine. Fig. 3 is a vertical central sectional view through the machine on line 3—3 of Fig. 4. Fig. 4 is a transverse section through the machine on line 4—4 Fig. 1. Fig. 5 is a sectional view taken on line 5—5 Fig. 1.

Similar numerals refer to similar parts throughout the drawings.

The machine comprises a housing or frame 1 supported upon a base 2 of any preferred construction, said frame having suitable work clamps 3 at its opposite sides and a drive shaft 4 journaled therein; and a carrier 5 having a circular saw 6 which is rotatably mounted eccentrically thereof, the carrier being adapted to be oscillated to feed the saw into operative engagement with the work A as the drive shaft is actuated and the saw rotated.

The frame 1 is suitably shaped to form a substantially rectangular housing with forward and rear side walls $1^a$ and $1^b$, except that at its upper end it is rounded to conform to the shape of the carrier 5 which is cylindrical in shape having forward and rear end walls 7 and $7^a$ connected together by means of a plurality of spaced crossbars 8 of which three are shown herein (Fig. 3). Said frame and carrier may each be in the form of an integral casting, and the opposite ends of the carrier are rotatably mounted in annular bearings 9 and 10 provided in the forward and rear sides, respectively, of the frame.

The bearing 9 is preferably formed by providing an annular inwardly extending flange $9^a$ on the inner side of the forward wall 6 of the frame adjacent the edge of a circular opening 11 formed in said wall; and the bearing 10 is formed by the edge of a circular opening 12 provided in the rear wall $1^b$ of the frame. Through this rear opening the carrier is adapted to be inserted into position within the frame. The bearing 9 is thus in the form of an angular groove or rabbet in which the forward end of the carrier bears; and a pair of arcuate plates $10^a$ are secured to the outer side of the rear wall $1^b$ of the frame as by means of screws 13, in such position that their inner edges protrude a short distance inwardly from the edge of the opening and thus form in effect a rabbet bearing for the rear end of the carrier.

The work clamps 3, which may be of any well-known construction, herein consist of a stationary jaw 14 secured to each of the forward and rear walls $1^a$ and $1^b$ of the frame as by means of bolts 15, and a movable jaw 16 operable by means of a screw spindle 17 having a bearing 19 formed integral with the frame. Said clamps are adapted to support the work to be operated upon, at one side of the frame, with the work extending transversely through alined arcuate slots 18 provided in the end walls 7 and $7^a$ of the carrier, at one side of their centers, to permit the carrier to oscillate with reference to the work carried by the frame. Said walls may also be provided with similar slots $18^a$ to afford convenient access to the interior of the carrier when desired.

The drive shaft 4 extends longitudinally through the frame 1 between the cross-bars 8 of the carrier (Fig. 3) and is journaled in suitable bearings 19 and 20 which may be formed on the forward and rear walls, respectively, of the frame. A collar 20ª is preferably secured to the shaft to lock the same against longitudinal movement.

One end of the shaft 4 has rotatably mounted thereon a driving pulley 4ª and near its center said shaft is provided with a worm 21 (Figs. 3 and 4), which meshes with a worm wheel 22 fixed to a central countershaft 23 mounted at its opposite ends in the end walls of the carrier. Immediately rearward of the worm wheel 21, the countershaft 23 is provided with a driving pinion 24 fixed thereto and meshing with a gear wheel 25 fixed to a shaft 26 which is rotatably mounted in the end walls of the carrier near the periphery thereof and carries at its forward end the circular saw 6.

The countershaft 23 and driven shaft 26 are preferably mounted in bearing bushings 27 provided in the end walls of the carrier and preferably said walls are provided with inturned annular flanges forming bearings 28 for the bushings. The worm wheel 22 and pinion 24 on the countershaft are made of a thickness to fit neatly between said bearings and the opposite ends of said countershaft are preferably provided with collars 29 which bear against the outer ends of the bushings 27. Similarly the gear wheel 25 and a spacing sleeve 30 provided on the shaft 26 fit neatly between the bearings 28; and the opposite ends of the shaft 26 are provided with a bearing collar 31 and a bearing cap 32 engaging with the outer ends of the bushings 27. The forward end of the shaft 26 is extended forwardly a short distance from the collar 31 for supporting the circular saw 6, the end of the shaft being reduced in size and threaded to receive a washer 33 and a securing nut 33ª.

By the construction thus far set forth, it will be evident that the rotation of the drive shaft and its gear connections in the direction of the arrows in Fig. 3 will cause the saw 6 to revolve to the left, Fig. 1, and that the saw may be readily swung into operative engagement with the work A supported by the clamps 3 without interfering in any way with the gearing connection between the drive shaft 4 and the driven shaft 26.

Means are preferably provided, however, for automatically rotating the carrier 5 as the machine is operated to feed the saw 6 gradually into operative engagement with the work. Such means comprises a stationary arcuate rack bar 34 carried by the frame, a pinion 35 carried by the end of a shaft 36 journaled in the carrier, a ratchet wheel 37 on the opposite end of said shaft, a pair of pawls 38 and 39 mounted one on each arm of a bell-crank lever 40 pivoted to the rear end wall of the carrier and eccentrically connected by means of a link 41 to the bearing cap 32 which is fixed on the rear end of the driven shaft 26.

The rack bar 34 is secured on the forward side of the frame near the lower periphery of the bearing opening 11, and the pinion 35 may be formed integral with the forward end of the shaft 36 which is journaled in bearings 42 formed in the end walls 7 and 7ª at their lower peripheries. The ratchet wheel 37 is secured near the rear end of the shaft 36 with its hub bearing against the outer side of the rear end wall of the carrier, and a collar 43 is fixed on the shaft to bear against the inner side of said wall to hold the shaft against longitudinal movement in its bearings.

The link 41 (Fig. 4) is provided at its upper end with a bearing bushing 44 which is clamped to the bearing cap by means of a bolt 45, said cap being transversely slotted as as 46 to receive the head and shank of the bolt.

It will thus be evident that the link 41 may be readily connected eccentrically to the cap 36 which rotates with the shaft 26, and by reason of the slotted engagement of the bolt with the cap, the link connections may be adjusted as desired; and when power is applied to the drive shaft to operate the saw 6, the link, acting through the bell-crank lever 40, causes the pawls 38 and 39 to rotate the ratchet wheel 37. Said wheel in turn causes the pinion 35 on the shaft 36 to engage with the rack 34 on the frame and thus the carrier is rotated to feed the rapidly revolving saw into engagement with the work A.

Means are provided for automatically stopping the machine after the cutting operation has been completed comprising, in this instance, a bell-crank lever 47 pivotally mounted upon the bearing bracket 48 secured at one end of the frame adjacent the drive shaft 4. An arm 49 secured to the rear wall of the carrier near its periphery, has a screw 50 threaded into its free end and secured in adjusted position by means of a lock nut 51. Said screw is adapted to engage with one arm of the lever 47 and the other arm of said lever is pivotally connected to a grooved collar 52 slidably but non-rotatably mounted on the drive shaft 4 and having a friction clutch member 52ª thereon adapted to operatively engage a coacting surface 52ᵇ in the drive pulley 4ª.

It will be evident that as the carrier is rotated to feed the saw into engagement with the work, the screw 50, carried by the arm 49, is moved into engagement with the lever 47, and the sliding collar 52 is thereby moved longitudinally of the drive shaft, and the parts are so proportioned and arranged that after the machine has completed its cutting operation the clutch will be operated to throw the machine out of operation.

In returning the carrier to its initial position for the next succeeding cutting operation, the actuating pawls 38 and 39 are lifted out of engagement with the ratchet wheel 37 whereupon the shaft 36 may be rotated reversely to the direction of operation of the machine, and the pinion 35 engaging with the rack 34 will cause the carrier to return to its initial position, whereupon the pawls may be dropped into engagement with the ratchet wheel for the next operation.

The means for rotating the shaft 36 for accomplishing this return movement of the carrier preferably consists of a hand-wheel 53 fixed to the forward end of said shaft adjacent the ratchet wheel as shown in Fig. 5.

I claim as my invention

1. A sawing machine including an oscillatory cylindrical carrier having a rotatable eccentrically mounted saw, means for supporting the work, means for operating the saw, and means for rotating the carrier to feed the saw into engagement with the work including a ratchet wheel and a bell-crank lever having a pair of pawls thereon and pivotally connected to said saw-rotating means for reciprocation thereby.

2. A sawing machine including a supporting frame, means carried by the frame for supporting the work, an oscillatory carrier mounted in the frame and having a rotatable saw, a rack and pinion connection between said frame and carrier, means for rotating the saw, and means driven by the saw-rotating means for rotating the pinion and thereby the carrier to feed the saw into engagement with the work.

3. A sawing machine including a frame, an oscillatory carrier mounted in the frame and having a driven shaft mounted eccentrically thereof with a circular saw thereon, clamping jaws on the frame arranged to support the work extended transversely through the carrier, means for rotating said shaft and saw, and means connected to the saw-rotating means for rotating the carrier as said shaft rotates, said carrier having openings in its opposite sides through which the work extends, adapted to permit the oscillation of the carrier with reference to the work.

4. A sawing machine including means for supporting a piece of work, a rotatable saw carrier, a shaft, a link adjustably connected to said shaft eccentrically thereof, and means actuated by said link as the shaft is rotated for feeding the saw into engagement with the work.

5. A sawing machine including a frame, means carried by the frame for supporting the work, an oscillatory carrier mounted in the frame and having a driven shaft with a circular saw thereon, a driving shaft journaled in the frame and geared to the driven shaft, and means for rotating the carrier as the driven shaft is rotated including a rack and pinion, and means connected to one of said shafts for rotating the pinion to feed the saw into engagement with the work.

6. A sawing machine including a frame, means carried by the frame for supporting the work, a carrier rotatably mounted in the frame and having a rotatable saw mounted eccentrically thereof, a shaft in gearing connection with the frame and carrier and having a ratchet wheel thereon, driving means for the saw, and means for rotating the carrier with reference to the frame, including a shaft, a link eccentrically connected to the shaft, and a lever having a pair of pawls thereon adapted to be actuated by the link to rotate the ratchet wheel.

7. A sawing machine including a frame, means carried by the frame for supporting the work, a carrier rotatably mounted in the frame and having a rotatable saw mounted eccentrically thereof, means for rotating the saw including a drive shaft, means for rotating the carrier in the frame, and means for disconnecting the drive shaft from the source of power at a predetermined point in the rotation of the carrier.

8. A sawing machine including a frame having front and rear walls, a cylindrical saw carrier journaled in the walls of the frame, and means for supporting the work transversely of the carrier, there being elongated apertures formed in the end walls of the carrier to permit the carrier to move relative to the work extending therethrough.

9. A sawing machine including a cylindrical saw carrier having openings in its opposite sides, a frame for rotatably supporting the carrier and forming a housing therefor, and means for stationarily supporting the work extended transversely through the carrier and through said openings in its sides.

10. A sawing machine having, in combination, a frame, an oscillatory carrier supported by the frame, a saw on said carrier, coöperating means for operating the saw and moving the carrier to feed the saw, said means including a driven element, and means for disconnecting said element from the source of power at a predetermined point in the movement of the carrier.

11. A sawing machine including a frame, an oscillatory saw carrier mounted in the frame, automatic feeding means for the carrier, means for stopping the machine at the end of the sawing operation, and means for returning the carrier to its initial position.

12. A sawing machine including a frame, a saw carrier rotatably mounted in the frame, means for automatically rotating the carrier with reference to the frame, and means for automatically stopping the rotation of the carrier at the end of the sawing operation.

13. A sawing machine including a frame, a rotatable carrier, a drive shaft extending longitudinally of the frame and through the carrier and mounted in the frame, a central countershaft mounted in the carrier and having a gear connection with the drive shaft, and a driven shaft mounted eccentrically of the carrier and geared to the countershaft for rotation by the drive shaft, said carrier having openings in its wall to permit a rotation thereof with reference to the shaft extending therethrough.

In testimony whereof, I have hereunto set my hand.

LUCIEN I. YEOMANS.

Copies of this patent may be obtained for five cents each, by addressing the "Commissioner of Patents, Washington, D. C."